United States Patent [19]

Dehnke

[11] 4,429,120

[45] Jan. 31, 1984

[54] ETHYLHYDROXYALKYLMETHYLCEL-LULOSE ETHERS

[75] Inventor: Mary K. Dehnke, Midland, Mich.

[73] Assignee: The Dow Chemical Company, Midland, Mich.

[21] Appl. No.: 454,133

[22] Filed: Dec. 29, 1982

[51] Int. Cl.$^3$ ..................... C08B 11/08; C08B 11/193
[52] U.S. Cl. .................................. 536/91; 106/197 R
[58] Field of Search .......................................... 536/91

[56] References Cited

U.S. PATENT DOCUMENTS

| | | | |
|---|---|---|---|
| 3,839,319 | 10/1974 | Greminger et al. | 536/91 |
| 3,873,518 | 3/1975 | Strange et al. | 536/91 |
| 4,096,325 | 6/1978 | Teng et al. | 536/91 |
| 4,283,229 | 8/1981 | Girg et al. | 106/171 |

*Primary Examiner*—Ronald W. Griffin

[57] ABSTRACT

Novel ethyl $C_{2-4}$ hydroxyalkylmethylcellulose ethers are disclosed which are soluble in a wide range of organic solvents, generally, thermoplastic and may be prepared having high molecular weights. These cellulose ethers are useful in organic systems as protective colloids, emulsifiers, film formers, thickeners and the like.

12 Claims, No Drawings

ETHYLHYDROXYALKYLMETHYLCELLULOSE ETHERS

BACKGROUND OF THE INVENTION

This invention relates to organo-soluble ethylhydroxyalkylmethylcellulose ethers.

Various cellulose ethers have been known and sold commercially for many years. These commercially available cellulose ethers are typically the reaction products of alkali cellulose with $C_{1-4}$ alkyl chlorides, $C_{2-4}$ alkylene oxides, chloroacetic acid and the like.

Most of the commercially available cellulose ethers such as methylcellulose, hydroxyethylmethylcellulose, hydroxypropylmethylcellulose, hydroxypropylcellulose and the like are employed as thickeners, protective colloids, film formers and for other uses in aqueous systems. While these cellulose ethers are useful in aqueous systems, the water-soluble ethers are generally insoluble in organic solvents and nonthermoplastics. Accordingly, these cellulose ethers cannot be employed in organic systems such as inks, and the like.

To meet the need for a cellulose ether with organic solubility, more hydrophobic cellulose derivatives such as ethylcellulose and ethylhydroxyethylcellulose have been developed. While these cellulose ethers are both organo-soluble and thermoplastic, said ethylcellulose and ethylhydroxyethylcellulose have other deficiencies which significantly limit their utility. For example, most ethylcellulose is not soluble in nonhydrogen bonded solvents, particularly those having low solubility parameters, such as $C_6$ or higher alkanes, benzene, alkyl substituted aromatics, and the like. Generally, if solubility in such nonpolar solvents is required, ethylcellulose cannot be employed. Since recent price increases have made the use of these nonpolar solvents more economically attractive, the insolubility of ethylcellulose in these solvents is a significant limitation on their use.

Certain very highly substituted ethylcellulose and ethylhydroxyethylcellulose derivatives do have the desired solubility in such solvents, but are very difficult and expensive to prepare.

In addition, due to the conditions of their preparation, both ethylcellulose and ethylhydroxyethylcellulose are generally available only in relatively low molecular weight species. This limitation in molecular weight greatly reduces the utility of these cellulose ethers. Accordingly, an organo-soluble cellulose ether which can be prepared having high molecular weights would be highly desired.

Moreover, the preparation of ethylhydroxyethylcellulose is difficult and expensive from a production viewpoint. The ethylene oxide used in the preparation of ethylhydroxyethylcellulose reacts with water, ethyl chloride and other impurities present in the reaction mixture. Consequently, the low overall yield of the process is greatly reduced and a variety of by-products are formed which are difficult to remove from the product.

Accordingly, a cellulose ether which is soluble in a wide variety of organic solvents and is thermoplastic would be highly desirable. Alternatively and additionally, an organo-soluble cellulose ether which may be prepared having high molecular weight and without the processing limitations of conventional organo-soluble ethers would be highly desired.

SUMMARY OF THE INVENTION

This invention is such a cellulose ether. This invention is an organo-soluble ethyl $C_{2-4}$ hydroxyalkylmethylcellulose ether. The ethylhydroxyalkylmethylcellulose ethers of this invention may be prepared free from the underlying process limitations of known organo-soluble cellulose ethers, resulting in lower production costs and fewer waste disposal problems. In addition, the EHAMC ethers of this invention do not have the inherent molecular weight limitations of ethylcellulose and ethylhydroxyethylcellulose. Moreover, by optimizing the ethoxyl degree of substitution, methoxyl degree of substitution and hydroxyalkyl molar substitution, EHAMC can be prepared having good solubility even in nonhydrogen bonded solvents having low solubility parameters.

In another aspect, this invention is a process for preparing an organo-soluble ethyl $C_{2-4}$ hydroxyalkylmethylcellulose ether comprising contacting a $C_{2-4}$ hydroxyalkylmethylcellulose ether with sufficient of an alkali metal hydroxide to catalyze the reaction between the hydroxyalkylmethylcellulose and ethyl halide, and then contacting the $C_{2-4}$ hydroxyalkylmethylcellulose with ethyl halide, under conditions including elevated temperature in the presence of said alkali metal hydroxide, such that sufficient of the ethyl halide reacts with the $C_{2-4}$ hydroxyalkylmethylcellulose to form an organo-soluble ethyl $C_{2-4}$ hydroxyalkylmethylcellulose ether. By using the process of this invention, cellulose derivatives having a wide range of organo-solubility are readily prepared. Moreover, this process can be employed to prepare organo-soluble cellulose ethers having high molecular weights.

DETAILED DESCRIPTION OF THE INVENTION

The ethylhydroxyalkylmethylcellulose ethers of this invention contain sufficient ethoxyl substitution to render the ether organo-soluble. In general, organo solubility increases with increasing ethoxyl content of the cellulose ether.

The amount of the ethoxyl substitution in the cellulose ether is expressed in terms of the average number of hydroxyl groups per anhydroglucose unit on the cellulose molecule which are substituted with ethyl groups (degree of substitution). Since there are three hydroxyl groups on an anhydroglucose unit of a cellulose molecule, the ethoxyl degree of substitution can, in theory, range from 0 to 3. While the minimum ethoxyl substitution required to render the particular cellulose ether organo-soluble depends somewhat on the amount of hydroxyalkyl and methoxy substitution, generally, the methoxy degree of substitution must be at least 0.5. Preferably the ethoxy degree of substitution (EDS) is at least 1.0, more preferably at least 1.2, most preferably at least 1.3. It is noted that, in general, as the EDS increases, the ethylhydroxyalkylmethylcellulose becomes soluble in an increasingly wide range of organic solvents. Solubility in Lactol* Spirits and other nonhydrogen bonded solvents having low solubility parameters is generally seen when the EDS is at least about 1.2, preferably at least about 1.3. It has been found that the ethoxyl substitution sometimes results in a product which is soluble in cold, i.e., 0°–5° C., water, but gels upon slightly heating the solution.

*Trademark of American Mineral Spirits Co.

The amount of methoxy substitution is also expressed as the average number of hydroxyl groups per anhydroglucose unit of the cellulose molecules which are substituted with methoxyl groups. It is noted that the sum of the methoxy degree of substitution (MDS) and the EDS may be no more than 3. Accordingly, the maximum MDS is 2.5. Preferably the MDS is less than 2.0, more preferably less than 1.8, most preferably less than about 1.6. The minimum MDS is that sufficient to reduce the amount of degradation of the cellulosic polymer which occurs during the ethoxylation thereof. As is described more fully hereinafter, the reaction conditions require to ethoxylate the cellulose molecule generally cause substantial degradation of the polymer, yielding lower molecular weight species. It has been found that the presence of some methoxy substitution tends to reduce the amount of degradation which occurs during the ethoxylation reaction. Such reduction of degradation is generally seen when the MDS is at least about 0.2, preferably at least about 0.8, more preferably at least about 1.1. Consequently, the maximum EDS is generally about 2.8 and is preferably less than about 2.2, more preferably less than about 1.9.

The amount of hydroxyalkyl substitution is expressed in the terms of the molar substitution, i.e., the average number of moles of alkylene oxide which reacts with each anhydroglucose unit of the cellulose molecule. Since a new hydroxyl group is formed each time an alkylene oxide molecule reacts with a cellulose molecule, there is no theoretical limit to the hydroxyalkyl molar substitution. However, the alkylene oxide cellulose reaction is not as facile as the methyl chloride reaction and in general the hydroxyalkyl molar substitution will be in the range from about 0.02 to about 1.5, more typically between about 0.1 and about 1.0. It has been found that the ethoxylation reaction proceeds more rapidly and in greater yield when the hydroxyalkyl molar substitution is increased. While the Applicant does not intend to be bound by any theory, it is believed that the ethoxylation reaction proceeds primarily and preferentially at the hydroxyl group of the hydroxyalkyl substituent, forming a 2-ethoxyalkoxy moiety on the molecule. Accordingly, hydroxyalkyl molar substitution is advantageously at least about 0.2, preferably at least about 0.5 and more preferably at least about 0.7.

The hydroxyalkyl substituent may be hydroxyethyl, hydroxybutyl or hydroxypropyl. In general, hydroxyethyl or hydroxypropyl substitution is preferred because it is more readily placed onto the cellulose molecule in the desired proportions. Hydroxypropyl substitution is most preferred as it presents the fewest production difficulties.

The ethylhydroxyalkylmethylcellulose ethers of this invention are prepared by reacting ethyl halide, ethylene, propylene or butylene oxide and methyl halide with alkali cellulose. Alkali cellulose is advantageously prepared by reacting cellulose pulp with a molar excess of an alkali metal hydroxide. The alkali metal hydroxide is generally employed as an aqueous solution containing 50 weight percent or more of the alkali metal hydroxide. The alkali cellulose is advantageously reacted with the alkylene oxide and the methyl halide, preferably methyl chloride, for 4 to 12 hours at a temperature of about 30°–80° C., preferably 40°–60° C., in the absence of air. The amounts of the alkylene oxide and methyl chloride are chosen to give the desired hydroxyalkyl and methoxy substitution.

The ethyl halide/alkali cellulose reaction may be carried out simultaneously with the alkylene oxide and methyl chloride reactions but it is much more preferable to ethoxylate previously prepared hydroxyalkylmethylcellulose. It has been found that it is difficult to obtain the desired ethoxyl degree of substitution when the ethoxylation reaction is run simultaneously with the methyl chloride and alkylene oxide reactions. In addition, it is believed that the improved organosolubility of the EHAMC of this invention is due in part to the capping of the hydroxyalkyl groups with the methoxy groups. This capping is more highly favored when hydroxyalkylmethylcellulose is prepared and subsequently ethoxylated. Moreover, the conditions generally required for ethoxylating alkali cellulose (i.e., 90°–150° C., 85–140 psi pressure) tend to cause substantial degradation of the cellulose chain. This degradation is found to be reduced when the ethoxylation reaction is carried out on the hydroxyalkylmethylcellulose rather than simultaneously with the alkylene oxide and the methyl chloride reactions.

The hydroxyalkylmethylcellulose used as a starting material in the preferred method of preparing the EHAMC may be prepared in situ as described hereinbefore. Alternatively and preferably, any of the commercial HAMC ethers having the desired hydroxyalkyl molar substitution and MDS may be used as a starting material. Especially useful starting materials are the hydroxypropylmethylcellulose ethers sold by The Dow Chemical Company as METHOCEL® E, METHOCEL® F, METHOCEL® K and, most preferably, METHOCEL® J. The HPMC is reacted with an alkali metal hydroxide, preferably sodium hydroxide, which is preferably employed as an aqueous solution containing at least 50 weight percent, more preferably at least 73 weight percent of the alkali metal hydroxide, and then contacted with an ethyl halide, preferably ethyl chloride. The reaction is run at conditions including elevated temperature sufficient to impart sufficient ethoxyl substitution to the cellulose ether to render it organo-soluble. Generally the reaction is run at a temperature of about 90°–150° C. for about 4–12 hours. The reaction is preferably run in the absence of air, under an inert atmosphere at super-atmospheric pressures. The reaction may be run as a slurry in an organic diluent such as benzene, toluene, or methyl ethyl ketone, or alternatively, in a dry process. Preferably, excess solid sodium hydroxide is added to the reaction to absorb excess water and minimize side reactions. After the reaction, the product is purified using an appropriate organic solvent such as a toluene/ethanol mixture and is ground and packaged as desired.

The molecular weight of the product cellulose ether is determined largely by the molecular weight of the raw cellulose pulp (or the molecular weight of the HAMC if HAMC is employed as a starting material) and the amount of degradation which occurs during the etherification reaction. Surprisingly, it has been found that especially when HAMC is employed as a starting material, the amount of degradation which occurs during the ethoxylation reaction is greatly reduced as compared to conventional ethylcellulose and ethylhydroxyethylcellulose products. Consequently, the EHAMC ethers of this invention may be prepared, if desired, having higher molecular weights than conventional ethylcellulose and ethylhydroxyethylcellulose products. Low molecular EHAMC products may be prepared by employing low molecular starting materials or by inducing the degradation of the polymer using known techniques such as the addition of oxygen, ozone or hydrogen peroxide to the alkali cellulose, bleaching the swelled cellulose pulp or alkali cellulose or other known methods.

The molecular weight of the EHAMC is generally expressed as the viscosity of the solution thereof in a solvent therefor. Unless otherwise noted, the molecular weight of the EHAMC is given herein as the viscosity (as measured using a Brookfield viscometer) at 20° C. of a 5 weight percent solution of the EHAMC in a solvent mixture containing 80 weight percent toluene and 20 weight percent ethanol. The EHAMC of the invention may be prepared having a 5 percent solution viscosity as low as 1 or less cps. Conversely, the 5 percent solution viscosity of the EHAMC of this invention can be 40,000 cps or higher. By contrast, 5 percent solution viscosities of ethylcellulose and ethylhydroxyethylcellulose generally do not exceed about 700 cps.

The EHAMC of this invention can be employed in the same manner as other organo-soluble cellulose ethers. Exemplary of such uses are as components in gel lacquers, varnishes, hot melt compositions and the like, thickeners in organic systems such as textile printing inks and rotogravure printing inks, binders in printing pastes and printing inks, binders and delayed release coatings for pharmaceuticals and the like. Because of the increased organosolubility and molecular weight of certain of these EHAMCs, these novel cellulose ethers may be employed in a greater variety of organic systems than conventional organo-soluble cellulose ethers. In addition, many of the EHPMCs of this invention are thermoplastic and can be used in applications where thermoplasticity is desired.

The EHAMC of this invention may be employed in any suitable form. For example, these cellulose ethers may employed as a solution in organic solvent therefor, as a bulk, granulated or powdered polymer or as a dispersion of microparticles in an aqueous medium, i.e., a latex.

The following examples are intended to illustrate the example but not to limit the scope thereof. All parts and percentages are by weight unless otherwise indicated.

EXAMPLE 1

Sample No. 1 is prepared by charging a Parr bomb with 800 g of toluene and 54 g of a hydroxypropylmethylcellulose having an HPMS from 0.1 to about 0.3, a MDS of about 1.1 to 1.6. The starting cellulose ether is water-soluble and exhibits a viscosity as a 2 percent aqueous solution at 20° C. of about 4,000 cps. The toluene is a reaction diluent. To the slurry is added a sodium hydroxide charge which is prepared by melting together 40 g of 50 percent aqueous sodium hydroxide solution and 34 g of solid sodium hydroxide. The reactor is evacuated and 75.6 g of additional sodium hydroxide (solid) are added. Then, 75 g ethyl chloride are added to the reactor. The reactor is closed and the reaction mixture is heated to 140° C. for 6 hours. Following the reaction, the product is dissolved in the toluene diluent. An 80 percent/20 percent ethanol mixture is added to dilute the reaction product. The product is then precipitated by the addition of hot water, filtered, neutralized, washed in cold water, and dried. The product thus recovered has a MDS of 1.36, an EDS of 1.0 and a HPMS of 0.24. The product swells in boiling Lactol* Spirits.

EXAMPLE 2

The general procedure of Example 1 is repeated this time employing as a starting material a hydroxypropylmethylcellulose having a MDS of 1.8 to 2.0, a HPMS of 0.2 to 0.31 and a 2 percent aqueous solution viscosity of 4,000 cps. The product has a MDS of 1.8, an EDS of 0.8 and an HPMS of 0.2. The product is soluble in toluene and 80/20 toluene/ethanol, and swells in Lactol* Spirits at room temperature. When gently heated in Lactol* Spirits, the product dissolves.

EXAMPLE 3

The general procedure of Example 1 is again repeated. In this run, a hydroxypropylmethylcellulose having a MDS of 1.1 to 1.6, an HPMS of 0.7 to 1.0, and a 2 percent aqueous solution viscosity of 40,000 cps is employed. In addition, the starting cellulose ether is lighly crosslinked with glyoxal to render it more readily dispersible in water. This time, the sodium hydroxide is added to the reactor as 40 g of 50 weight percent aqueous solution of sodium hydroxide, followed by adding 109.6 g of solid sodium hydroxide to the rapidly stirred mixture. This mixture is then allowed to agitate for 10 minutes before evacuating the reactor and adding the ethyl chloride. The product has a MDS of 1.41, an EDS of 1.25 and an HPMS of 0.60. This material dissolves in Lactol* Spirits and Freon$^{TM}$ 11 (sold commercially by E. I. du Pont de Nemours & Co.).

EXAMPLE 4

The procedure of Example 1 is again repeated, this time using as a starting material a hydroxypropylmethylcellulose having a MDS of 1.1–1.6, an HPMS of 0.7–1.0 and a 2 percent aqueous solution viscosity of 75,000 cps. The product has a MDS of 1.26, an EDS of 1.09 and an HPMS of 0.6. It is soluble in Lactol* Spirits yielding a solution having a 2 percent solution viscosity in Lactol* Spirits of 1700 cps. The material is heated in a melting point apparatus and found to soften at 155° C. and to melt at 197°–200° C. without evidence of degradation.

EXAMPLE 5

The reaction of Example 1 is again repeated, this time using a hydroxybutylmethylcellulose having an HBMS of about 0.03, a MDS of about 1.9 and a viscosity as a 2 percent solution in water of 100 cps. The product has a MDS of 1.77, an EDS of 0.95 and an HBMS of 0.03. The product does not swell or dissolve in water and swells in cold Lactol* Spirits. The product is insoluble in water at room temperature, but dissolves in ice cold (0°–5° C.) water. Upon heating in Lactol* Spirits, the product completely dissolves. The product is also soluble in toluene and 80/20 toluene/ethanol.

EXAMPLE 6

To a 3-gallon reactor is added 260 g of an aqueous solution containing 50 weight percent sodium hydroxide. The reactor is sealed and 2,600 ml of toluene are added through an addition port. To this are added 400 g of a hydroxypropylmethylcellulose having a MDS of 1.1–1.6, an HPMS of 0.7–1.0 and a 2 percent aqueous solution viscosity of 5,000 cps. The caustic, toluene and HPMC are agitated for 15 minutes and then heated to 70° C. To the heated solution are added 1,113 g of bead sodium hydroxide and 2,650 g of additional toluene. The reactor is again sealed for 30 minutes and 5.5 lbs of ethyl chloride are added. The reactor is then heated to 140° C. for 9 hours. The reaction mass is cooled to 80° C. and an additional 2.5 lbs of ethylchloride are added. The reaction mixture is then reheated to 140° C. for 3.5 hours. The product, which became dissolved in the toluene diluent, is then removed from the reactor, diluted in additional 80 percent toluene/20 percent ethanol and granulated. The product has a MDS of 1.3, an EDS of 1.4 and HPMS of 0.7. Solutions containing various concentrations of this product in various solvents are prepared, and the viscosities thereof are as reported in the following table.

| Solvent | Viscosity (cps) | | |
|---|---|---|---|
| | 1%[1] | 3%[2] | 5%[3] |
| Lactol Spirits | 33 | 590 | 3960 |
| Gravure Ink[4] Solvent | 32 | 470 | 1640 |
| 80/20 Toluene Ethanol | 28 | 233 | 1430 |

[1]Solution containing 1 weight percent of the sample.
[2]Solution containing 3 weight percent of the sample.
[3]Solution containing 5 weight percent of the sample.
[4]Recovered Lactol Spirits commonly employed in ink formulations.

By contrast, high viscosity ethylhydroxyethylcellulose products generally exhibit a 5 percent solution viscosity in 80/20 toluene/ethanol of 650 cps or less.

What is claimed is:

1. An organo-soluble ethyl $C_{2-4}$ hydroxyalkylmethylcellulose.

2. An organo-soluble ethyl $C_{2-4}$ hydroxyalkylmethylcellulose having an ethoxy degree of substitution of about 0.5 to 2.0, a methoxy degree of substitution of about 0.2 to 2.5 and a hydroxyalkyl molar substitution of about 0.02 to about 1.2.

3. The ethylhydroxyalkylmethylcellulose of claim 2 wherein the hydroxyalkyl group is a hydroxypropyl group.

4. The ethylhydroxypropylmethylcellulose of claim 3 wherein the ethoxy degree of substitution is at least about 0.8 and the hydroxypropyl molar substitution is at least about 0.2.

5. The ethylhydroxylpropylmethylcellulose of claim 4 wherein the ethoxy degree of substitution is at least about 1.2, the hydroxypropyl molar substitution is between 0.7 and 1.0, and the methoxy degree of substitution is at least 1.0.

6. The ethylhydroxalkylmethylcellulose of claim 2 wherein said cellulose ether exhibits a viscosity at 20° C. as a solution containing 5 weight percent of said cellulose ether in a mixture of 80 percent toluene and 20 percent ethanol of at least 700 cps.

7. The ethylhydroxypropylmethylcellulose of claim 5 which forms a clear solution in Lactol* Spirits at 20° C.

8. The ethylhydroxyalkylmethylcellulose of claim 1 which is thermoplastic.

9. A process for preparing an organo-soluble ethyl $C_{2-4}$ hydroxyalkylmethylcellulose ether comprising contacting a $C_{2-4}$ hydroxyalkylmethylcellulose ether with sufficient of an alkali metal hydroxide to catalyze the reaction between the $C_{2-4}$ hydroxyalkylmethylcellulose and ethyl halide, and then contacting the $C_{2-4}$ hydroxyalkylmethylcellulose with ethyl halide in the presence of said alkali metal hydroxide under conditions including an elevated temperature such that sufficient ethyl halide reacts with the $C_{2-4}$ hydroxyalkylmethylcellulose to form an organo-soluble ethyl $C_{2-4}$ hydroxyalkylmethylcellulose ether.

10. The process of claim 9 wherein the alkali metal hydroxide is sodium hydroxide and the ethyl halide is ethyl chloride.

11. The process of claim 10 wherein the ethyl $C_{2-4}$ hydroxyalkylmethylcellulose has an ethoxyl degree of substitution of at least 1.2.

12. The process of claim 10 wherein the ethyl $C_{2-4}$ hydroxyalkylmethylcellulose has a viscosity of at least 700 cps as measured as a 5 weight percent solution in a mixture of 80 percent toluene and 20 percent ethanol.

* * * * *